United States Patent [19]
Chaundy et al.

[11] 3,885,294
[45] May 27, 1975

[54] METHOD OF MAKING A BONDED SILICON NITRIDE ARTICLE HAVING PORTIONS OF DIFFERENT DENSITY

[75] Inventors: Gerald J. Chaundy, Livonia; Andre Ezis, Grosse Ile; Michael U. Goodyear, Plymouth; Benjamin T. Howes, Birmingham; Carl F. Johnson, Detroit; Karsten H. Styhr, Farmington, all of Mich.

[73] Assignee: Ford Motor Company, Dearborn, Mich.

[22] Filed: Apr. 3, 1974

[21] Appl. No.: 457,536

[52] U.S. Cl.......... 29/420; 29/156.8 B; 29/156.8 R; 29/424; 29/470; 423/344
[51] Int. Cl.............................................. B22f 7/06
[58] Field of Search ........ 29/156.8 B, 156.8 R, 420, 29/424, 497.5, 498, 470; 264/40, 56, 65, 66, 83, 86; 423/470

[56] References Cited
UNITED STATES PATENTS

| | | | |
|---|---|---|---|
| 2,618,565 | 11/1952 | Nicholson | 423/344 X |
| 3,778,231 | 12/1973 | Taylor | 264/66 X |
| 3,854,189 | 12/1974 | Ezis et al. | 29/420 |

FOREIGN PATENTS OR APPLICATIONS

| | | | |
|---|---|---|---|
| 568,458 | 1/1959 | Canada | 264/65 |
| 887,942 | 1/1962 | United Kingdom | 264/66 |
| 895,769 | 5/1962 | United Kingdom | 423/344 |
| 1,930,683 | 4/1970 | Germany | 423/344 |

OTHER PUBLICATIONS

R. Gill and G. Spence, "Self Bonded Silicon Nitride," The Refraction Journal, (March 1962), pp. 92-95.

*Primary Examiner*—Richard J. Herbst
*Assistant Examiner*—D. C. Reiley, III
*Attorney, Agent, or Firm*—William E. Johnson; Keith L. Zerschling

[57] ABSTRACT

A method of making a duo density article of silicon nitride is taught. A first article portion is formed by shaping silicon metal particles into a suitable configuration and nitriding the same. A release agent is applied to selected surfaces of the first article portion. A readily formable encapsolent, having relatively low strength, is applied to the selected surface of the first article portion. The encapsolent is converted to a high strength material. A second article portion of silicon nitride is hot press bonded to a surface of the first article portion which has no encapsolent thereon. The encapsolent is machined to remove portions thereof, the removal of such portions freeing other portions of the encapsolent to be removed as individual segments.

9 Claims, 5 Drawing Figures

METHOD OF MAKING A BONDED SILICON NITRIDE ARTICLE HAVING PORTIONS OF DIFFERENT DENSITY

This application results from development work carried on for the Department of the Army under Contract No. DAAG 46-71-C-0162.

BACKGROUND OF THE INVENTION

Silicon nitride has a wide variety of uses based on its physical and chemical properties. These uses, to name a few, include thermocouple protection tubes, crucibles for foundry use, substrates for electronic applications and structural components for gas turbine engines.

Silicon nitride can be produced by a number of different processing techniques with each technique yielding a different final density. Each technique also has a definite restriction on the final shape which may be produced. Simple shapes of better than 98 percent of theoretical density can be made by hot pressing silicon nitride powder to form the final article. Complex shapes, however, generally cannot be manufactured by this processing technique.

As an alternate to the hot pressing technique, silicon nitride articles of complex shape, having densities of 70 to 75 percent of theoretical density are produced by an injection molding technique. In this technique, silicon metal particles and a thermoplastic are formed into a mixture. This mixture is injection molded to form the shape of the article. Subsequent operations include the heating of the article to burn out the thermoplastic and a nitriding operation to produce the final silicon nitride article.

It is generally impossible to fabricate a complete rotor for a gas turbine engine of hot pressed silicon nitride material. The impossibility of manufacturing such a complete rotor by a hot pressing technique comes about because of the complex shape of the rotor blades. The complex shape of such blades can be formed by an injection molding technique. It is impossible, however, to form a complete rotor by an injection molding technique as the hub portion of the rotor formed by such a technique cannot withstand the mechanical and the thermal stresses imposed on that portion of the rotor during use in an engine.

This invention teaches a method wherein the best characteristics of hot pressed and other forms of silicon nitride material, such as an injection molded material, are brought together to form a complex article of manufacture such as a rotor for a gas turbine engine. The structure is bonded together by a strong and uniform bond at the junction between the different materials.

SUMMARY OF THE INVENTION

This invention is directed to a method of making an article of silicon nitride and, more particularly, to a method of making a duo density article of silicon nitride. The method has the following general steps.

A first article portion of silicon nitride is formed by shaping silicon metal particles into a suitable configuration and then nitriding the same. This forming operation may be accomplished, for example, by an injection molding technique in which silicon metal particles carried in a thermoplastic material are injected into a mold defining the configuration to be formed. The material is heated to burn away the plastic and nitrided to form the first article portion. The first article portion may also be formed in a slip casting operation in which a silicon metal slip is cast into a porous mold defining the shape to be formed. The material is removed from the mold and nitrided in order to form the first article portion.

A release agent is applied to selected surfaces of the first article portion. The agent is applied to those surfaces of the article which will aid in supporting the first article portion during other manufacturing steps.

An encapsolent is applied to the selected surfaces of the first article portion. The encapsolent is one which is readily formable but of relatively low strength during its formation. The encapsolent may, for example, be an injection molded silicon material which is convertible into silicon nitride. The encapsolent may also be a slip cast silicon nitride material or any other material which has the requirements of formability and low strength.

The encapsolent is converted to a high strength material. If the encapsolent was formed by injection molding or slip casting silicon metal particles, the encapsolent is converted to a high strength material by nitriding the silicon metal particles. The encapsolent provides a solid mass of material around the first article portion for supporting that portion during subsequent processing operations.

A second article portion of pure silicon nitride is hot press bonded to a surface of the first article portion having no encapsolent thereon. The hot press bonding of the two portions produces a strong and uniformly bonded joint therebetween so that the two portions function together as a unitary piece.

After bonding, the encapsolent is machined to remove portions thereof. The removal of such portions also acts to free up other portions of the encapsolent which can be removed as individual segments.

DESCRIPTION OF THE PREFERRED EMBODIMENT

Figure 1:
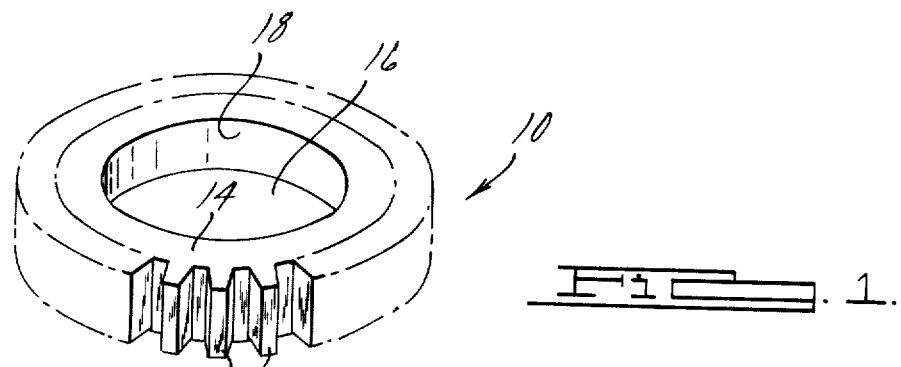
FIG. 1 is a perspective view of an article to be subjected to the method of this invention.

In FIG. 1 there is shown an article, generally identified by the numeral 10, made from silicon nitride. In this case, the article is a rotor for a gas turbine engine. The rotor has blades 12 secured to a ring 14. For simplicity sake, the blades are shown more as gear teeth rather than being shown with the curvature normally associated with such blades.

The rotor can be made of silicon nitride in many different manners. For example, the article 10 may be manufactured from slip cast silicon metal particles by nitriding such particles. A complete description of a manner of making such a slip cast article is contained in U.S. Pat. application, Ser. No. 426,836, filed Dec. 20, 1973 and entitled "Method for Making An Article of Complex Shape by Slip Casting." This patent application is assigned to the same assignee as this application and is hereby incorporated by reference.

The article 10 may also be made by a process in which silicon metal particles are injection molded to form the general shape desired. The shape is nitrided in order to produce the finished article of silicon nitride. Such a method is taught in U.S. Pat. application, Ser. No. 415,898, filed Nov. 14, 1973 for "Process for Making a Silicon Nitride Article." This patent application is also assigned to the same assignee as this application and is hereby incorporated by reference.

The method of this invention teaches a process for bonding the article 10 to another silicon nitride article which fits within a central opening 16 of the article 10. In such a manner, the outer blade ring of the article can be manufactured by a process which allows production of an intricately shaped article. The central portion of the article may be produced by methods which produce an extremely high strength silicon nitride article. When the two elements are bonded together, a unified article is produced which has an exterior configuration of complex shape.

The method of this invention is initiated by applying a suitable release agent to the surfaces of the article 10 which are to be supported during the bonding operation. The blades 12 and the ring 14 of the article are coated with graphite or boron nitride which acts as a release agent. An internal surface 18 of the article is not coated because this is the surface to which the other article portion will be bonded.

Figure 2:
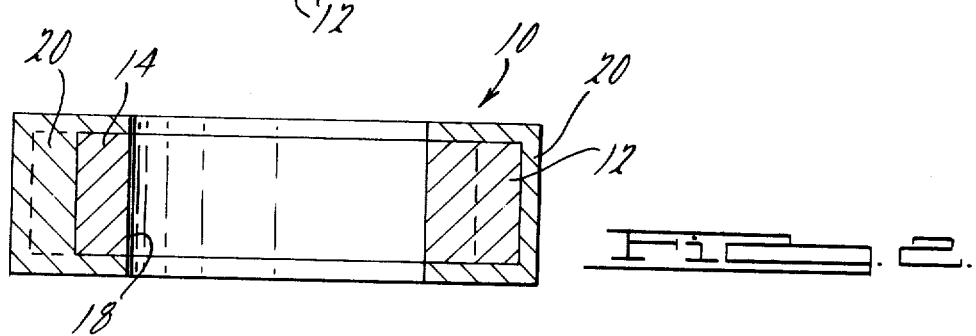
FIGS. 2, 3, 4 and 5 represent various one of the processing steps in the method of this invention.

Reference is now made to FIG. 2. This figure shows the article 10 with an encapsolent 20 covering the blades, as shown on the right side of the figure, and filling in between individual blades, as shown on the left side of the figure. The encapsolent also overlies the ring 14 of the article but does not cover the internal surface 18. The encapsolent is a material which is readily formable but has relatively low strength when initially applied. The encapsolent must be capable of being converted into a high strength material in a later operation. The encapsolent may be applied in many manners and some of them are illustrated herein.

The encapsolent 20 may be applied to the article 10 in the following manner. Particles of silicon metal carried by a thermoplastic are injection molded around the areas to be covered. In such a case the article 10 would be supported in a die structure (not shown) and the silicon particles injected therearound. In a nitriding operation, the silicon particles are transformed into silicon nitride having a high strength. The manner of injection molding and transforming silicon into silicon nitride is as described in the above-referenced patent applications. In such a manner a readily formable and low strength material, namely the silicon metal particles, are placed around the article as an encapsolent. These silicon metal particles are transformed into a high strength material by the nitriding operation.

Another procedure for forming the encapsolent 20 is as follows. Silicon metal particles are slip cast against the surfaces of the article 10 which are to be encapsulated. The silicon metal particles are transformed into silicon nitride in a nitriding operation such as described in the above-referenced patent applications. Once again the original form of the encapsolent is such that the encapsolent is readily workable but of low strength. The nitriding operation transforms the encapsolent into a high strength material which supports the article when another article portion of silicon nitride is bonded to the internal surface 18 of the article.

Figure 3:
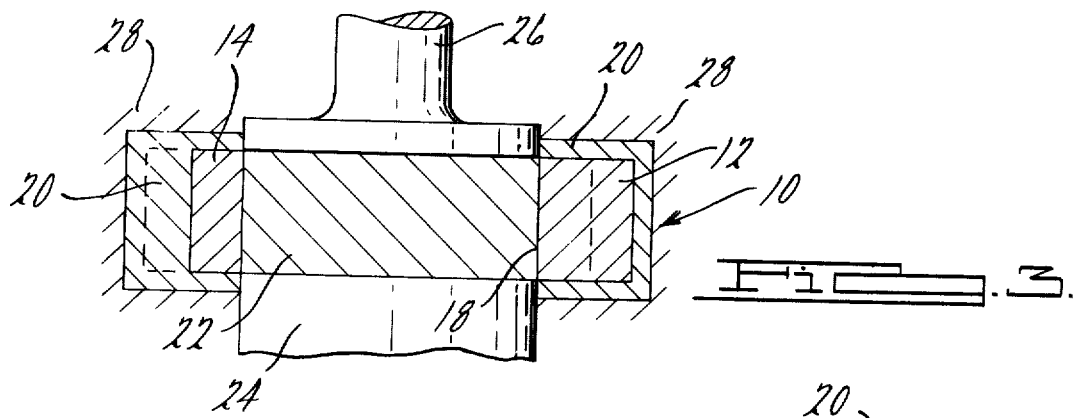

Reference is now made to FIG. 3. In this figure, the article 10 is shown during an operation in which a hub element 22 is hot press bonded to the internal surface 18 thereof. The hub element is supported on a support 24 for the bonding operation. A piston 26 is used to apply pressure to the hub element in order to cause it to flow into bonding relationship with the internal surface. Heat and pressure are simultaneously applied in the hot press bonding operation. A static medium 28, for example solid graphite, is placed around the encapsolent to resist the pressure of the hot press bonding operation. The static medium acts in conjunction with the encapsolent to apply a uniform resisting pressure on the encapsulated surfaces against the forces acting on the article during the bonding operation. The encapsolent is the device through which the static medium acts in resisting the pressure applied by the piston. The pressure applied on the hub element is from at least 1000 lbs. per square inch to about 3500 lbs. per square inch. The elements are maintained at a temperature in the range from 1625°C to about 1700°C for a time of at least 1.5 hours.

During this hot press bonding operation, a bond is formed between the hub element 22 and the internal surface 18 of the article 10. The silicon nitride of both surfaces tends to migrate into the other surfaces thereby forming a uniform and strong bond therebetween.

The hub element 22 is generally formed in a hot pressing operation in which silicon nitride particles are compacted under heat and pressure. After its formation the element is subjected to a hot press bonding operation which bonds the element to the article 10. The hub element may also be formed by slip casting or injection molding but hubs formed in such a manner generally do not have the strength that a hot pressed hub has.

Figure 4:
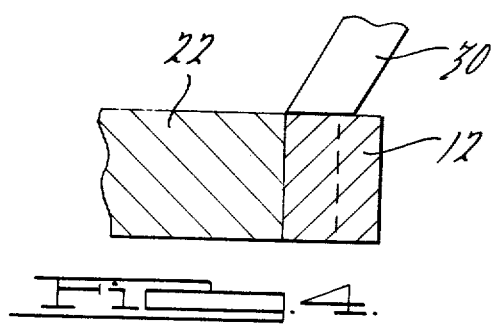
Figure 5:
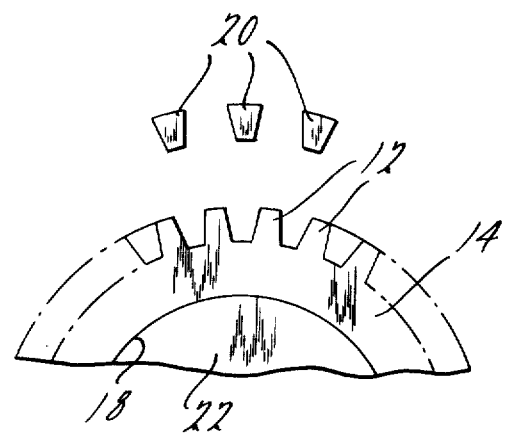

After the hot press bonding operation shown in FIG. 3, the combined article is further processed as shown in FIG. 4. In FIG. 4, a machine tool 30 is shown in engagement with the surfaces of the article 10 originally covered by the encapsolent 20. This machining operation removes the encapsolent from these surfaces. When the encapsolent is removed from these surfaces, a slight amount of machining may also be carried out to dress off the surfaces and make them flat and smooth. After the machining operation, encapsolent portions 20 formed between the blades 12 are removed. These portions are removable because of the application of the release agent.

The completed article is formed of silicon nitride material having two different densities. Both of the differently formed silicon nitride materials are bonded uniformly to one another to produce the final article which exhibits all the strength and temperature resistant characteristics for which silicon nitride is known.

There has been disclosed herein a method of making a duo density article of silicon nitride. In view of the teachings of this specification, those skilled in the art will be led to make modifications of this invention. It is intended that all modifications which fall within the spirit and scope of this invention be included within the appended claims.

We claim:
1. A method of making a duo density article of silicon nitride which comprises:
 forming a first article portion of silicon nitride by shaping silicon metal particles into a suitable configuration and nitriding the same;
 applying a release agent to selected surfaces of the first article portion;

applying an encapsolent which is readily formable but of relatively low strength to the selected surfaces of the first article portion;

converting the encapsolent to a high strength material;

hot press bonding a second article portion of silicon nitride to a surface of the first article portion which has no encapsolent thereon;

machining the encapsolent to remove portions thereof, the removal of such portions freeing other portions of the encapsolent to be removed as individual segments.

2. The method of claim 1 wherein: the encapsolent is applied by applying a silicon metal particle encapsolent to the selected surfaces and then nitriding the silicon metal particle encapsolent.

3. A method of making a duo density article of silicon nitirde which comprises:

forming a first article portion of silicon nitride by shaping silicon metal particles into a suitable configuration and nitriding the same;

applying a release agent to selected surfaces of the first article portion;

applying a silicon metal particle encapsolent to the selected surfaces of the first article portion;

nitriding the silicon metal particle encapsolent;

hot press bonding a second article portion of silicon nitride to a surface of the first article portion which has no silicon nitride encapsolent thereon;

machining the silicon nitride encapsolent to remove portions thereof, the removal of such portions freeing other portions of the encapsolent to be removed as individual segments, whereby the duo density article is produced.

4. The method of claim 3 wherein: the selected surfaces to which the release agent and the silicon metal particle encapsolent are applied are the surfaces which require support during fabrication of the duo density article.

5. The method of claim 3 wherein: the first article portion is formed by an injection molding operation.

6. The method of claim 3 wherein: the first article portion is formed by a slip casting operation.

7. The method of claim 3 wherein: the silicon metal particle encapsolent is applied by an injection molding operation.

8. The method of claim 3 wherein: the silicon metal encapsolent is applied by a slip casting operation.

9. The method of claim 3 wherein: the hot press bonding operation is carried out at a temperature of from about 1625°C to about 1700°C, at a pressure of at least 1000 psi, and for a time of at least 1.5 hours.

* * * * *